No. 636,965. Patented Nov. 14, 1899.
T. B. ENTZ.
ELECTRIC VEHICLE.
(Application filed Aug. 5, 1899.)
(No Model.)
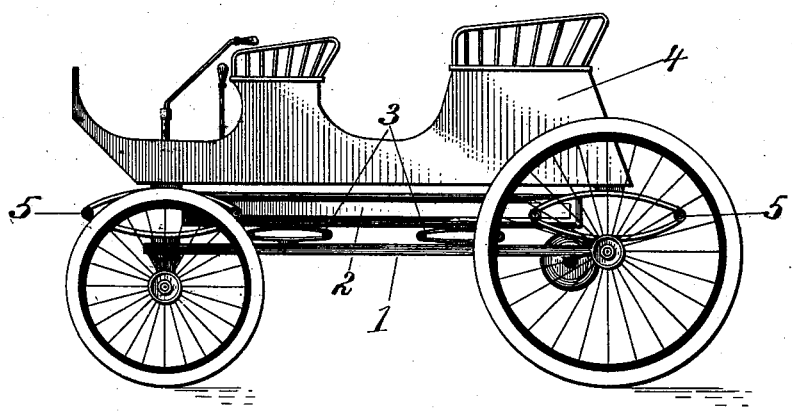

UNITED STATES PATENT OFFICE.

THEODORE B. ENTZ, OF PHILADELPHIA, PENNSYLVANIA.

ELECTRIC VEHICLE.

SPECIFICATION forming part of Letters Patent No. 636,965, dated November 14, 1899.

Application filed August 5, 1899. Serial No. 726,280. (No model.)

*To all whom it may concern:*

Be it known that I, THEODORE B. ENTZ, a citizen of the United States, residing at the city of Philadelphia, in the county of Philadelphia and State of Pennsylvania, have invented certain new and useful Improvements in Electric Vehicles, of which the following is a specification.

The object of the present invention is to afford comfort to the occupants of the carriage and to protect the battery from undue jars to which it might be subjected under certain well-known conditions.

To this and other ends the invention comprises the improvements hereinafter described and claimed.

The nature, characteristic features, and scope of the invention will be more fully understood from the following description, taken in connection with the accompanying drawing, forming part hereof, and in which is illustrated an electric vehicle embodying features of my invention.

In the drawing, 1 is a truck which comprises axles, reaches, perches, and wheels. This truck may also be advantageously equipped with steering-gear used as a support for the motor or motors.

2 is a battery-box, and 3 are springs interposed between the battery-box and truck and constructed with reference to the duty which they have to perform in carrying the battery-box.

4 is a carriage-body complete in itself and equipped with seats and with provisions for the feet of the occupants. Between this carriage-body and the truck are interposed springs 5, whose sole duty is to afford comfort to the passengers.

The described construction presents advantages, of which the following may be stated: The battery-box is wholly independent of the carriage-body, so that its weight and mass do not cause the carriage-body to run heavily, and such fumes as are given off from it cannot reach the occupants of the carriage, because the box may be well ventilated. In the event of the vehicle traversing uneven roadways or obstructions the ensuing jars or shocks are compensated for independently by the respective sets of springs. In this way the comfort of the passengers is insured.

It will be obvious to those skilled in the art to which the invention relates that modifications may be made in details without departing from the spirit thereof. Hence I do not limit myself to the precise construction and arrangement of parts herein referred to and shown on the drawing.

Having thus described the nature and objects of my invention, what I claim as new, and desire to secure by Letters Patent, is—

An electric vehicle comprising, a truck consisting of axles and wheels and perches or reaches rigidly attached to the axles, a motor on the truck, a battery-box, a carriage-body, and two sets of springs whereof one set is interposed between the truck and the carriage-body and the other set is interposed between the battery-box and the truck, substantially as described.

In testimony whereof I have hereunto signed my name.

THEODORE B. ENTZ.

In presence of—
 W. V. JACKSON,
 DORA STERNBERGER.